Oct. 2, 1962 P. GRAHAM 3,056,627
SAFE VEHICLE BODY
Filed Dec. 3, 1959 3 Sheets-Sheet 1
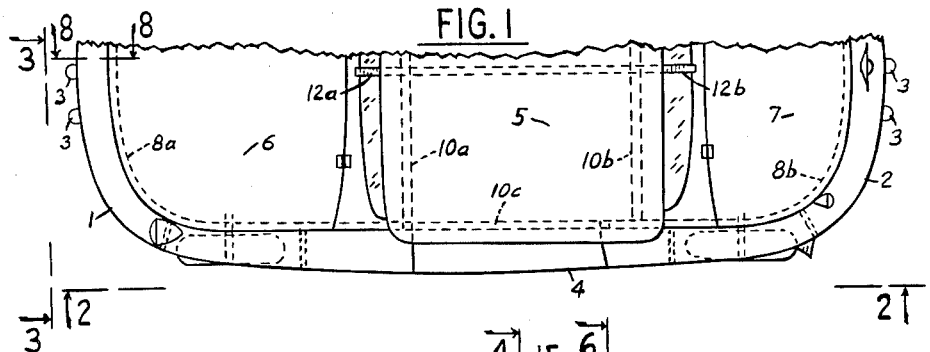
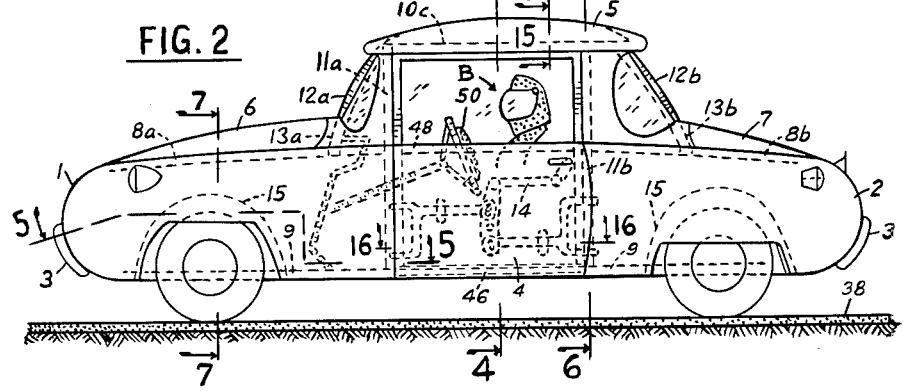
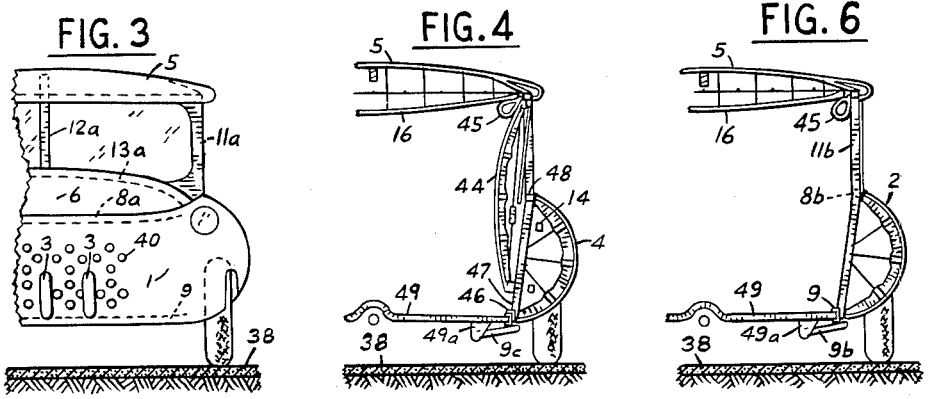
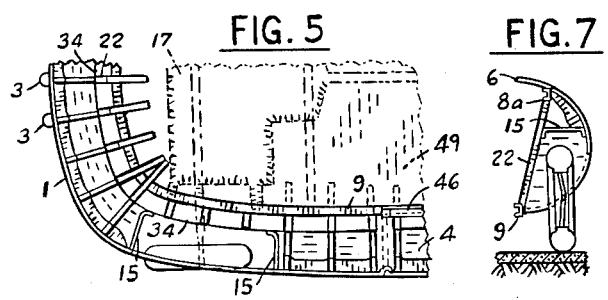
INVENTOR.
Phillip Graham
BY
William J. Ruano
ATTORNEY

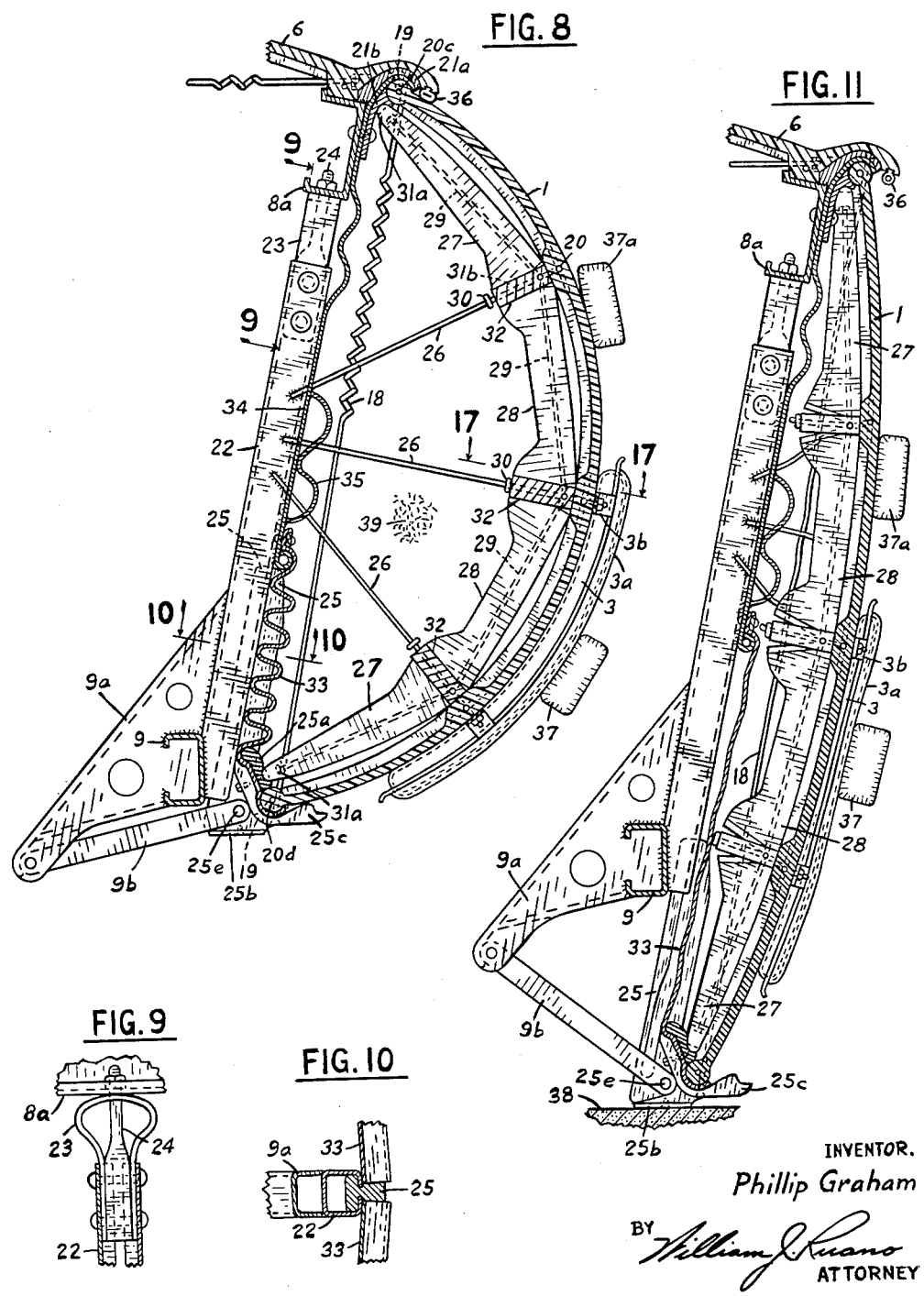

Oct. 2, 1962 P. GRAHAM 3,056,627
SAFE VEHICLE BODY
Filed Dec. 3, 1959 3 Sheets-Sheet 3
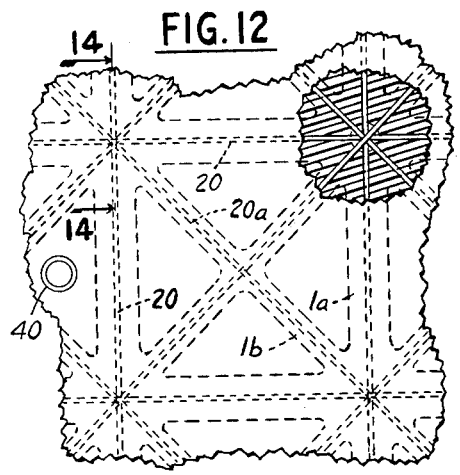
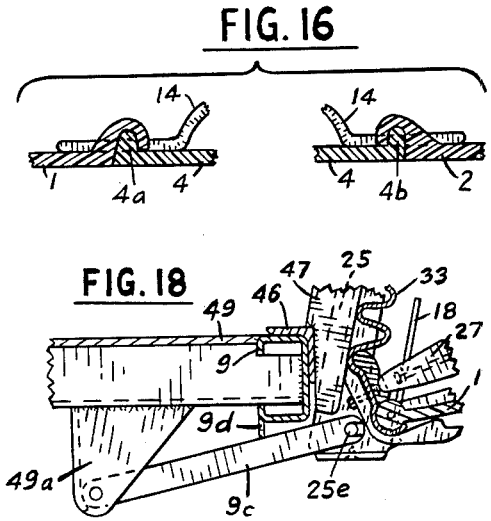
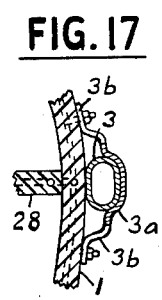
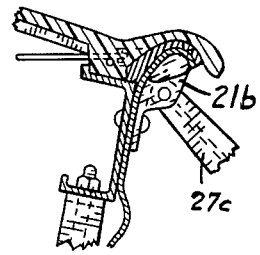
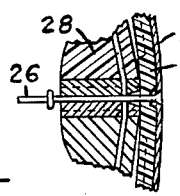
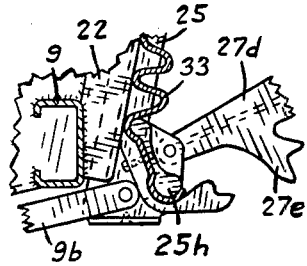
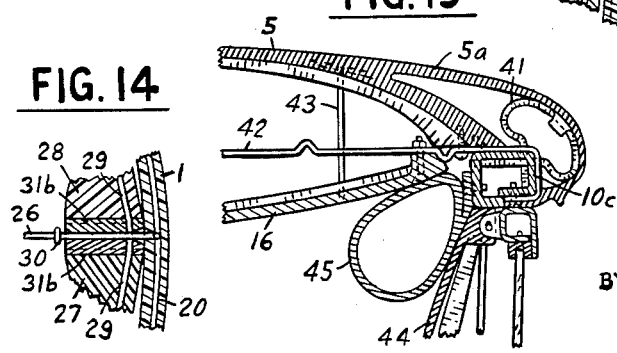
INVENTOR.
Phillip Graham
BY
William J. Ruano
ATTORNEY

United States Patent Office 3,056,627
Patented Oct. 2, 1962

3,056,627
SAFE VEHICLE BODY
Phillip Graham, 2825 Glenmore Ave., Pittsburgh 16, Pa.
Filed Dec. 3, 1959, Ser. No. 857,187
6 Claims. (Cl. 296—28)

This invention relates to a safe vehicle body, such as a cushionable automobile body and the like, that has a plastic shell which is slightly resilient. The body, according to the present invention, will yield and rebound without permanent deformation from the impacts of most minor collisions, which impacts would severely damage conventional automobile bodies. Under more violent colliding forces, the body will be damaged while gradually yielding in absorbing and diverting the violent collision forces. Thus the safe body would be expendable to protectively cushion the occupants of the conveyance.

This invention is a continuation-in-part of my co-pending applications Serial No. 557,938, filed January 9, 1956, entitled Safe Conveyance Body, now Patent No. 2,916,324, and Serial No. 721,150, filed March 13, 1958, entitled Curved Barrier. While this type of safe vehicle body would be most useful for vehicles, such as automobiles, it may also be used for trucks, buses, trailers, planes, small boats, and other vehicles. The term automobile, as used in the specification and claims, does not exclude automobiles having three wheels—that is, of the scooter type.

Common automobile bodies that are involved in violent collisions fail without adequately cushioning the severe collision forces. The common automobile body crumples to an extent because the shell and framing combination offers little resistance to violent collision forces. The shell buckles under minor impact forces. The collision forces are absorbed by the action of crumpling and tearing of the steel members of the automobile, which causes excessive deformation towards the occupant's positions and creates inadequate cushioning action. The automobile body fails locally and almost instantly at the point of impact since the body does not have the means to spread the initial impact force into a much larger portion of the body. Generally, the occupants of common automobile bodies are killed or injured when the automobile body fails to an extent that the occupant's compartment is penetrated by failing members, including the motor and the lower portion of the steering column. The common automobile body has very little resistance against violent collision forces that strike it broadside.

An automobile body embodying the principles of the present invention offers a great degree of protection against the violent forces of collisions in which it is involved, since it will yield and cushion or divert the violent impacts. The vehicle body will rebound from most minor collision impacts. The body has means to yieldingly resist more violent collision forces by progressively yielding while resisting, and then collapsing in steps to absorb and cushion the force—also means to divert some of the force downwardly into the roadway which absorbs it when a portion of the body flattens and strikes the roadway. Furthermore, there is means to divert some of the collision force upwardly, which diversion absorbs some of the force by lifting the adjacent portion of the automobile, which lifting tends to hurl the portion upwardly. The automobile body, being resilient, tends to bounce harmlessly away from heavy objects it collides with at an angle, rather than to become entangled with the objects and to be dragged into further hazards. The safe vehicle body can bounce away from objects it sideswipes, so it is safe to use on narrow traffic lanes.

The safe vehicle body embodying the principles of the present invention acts as a unit in resisting and yielding to cushion and protect the occupants, because there is continuity in the arrangement of the body members so the collision force can be spread widely through the structure to bring much of the body into play. The vehicle body, exclusive of the chassis, can effectively transmit considerable thrusts longitudinally of the vehicle, thus reducing the tendency of collision forces to deform the chassis. The safe vehicle body provides more protection than can be had by using energy absorbing bumpers on common automobiles. Such bumpers cannot effectively cushion collision thrusts from any angle. Furthermore, such bumpers are attached to the chassis which limits the amount of stress that can be transmitted to bring more of the body structure into play.

The safe vehicle body can provide considerable protection from a collision thrust at any angle, whereas most bumpers offer little protection from a collision at an angle. Automobiles are usually veered just before a collision when the operator tries to avoid a collision, thus the safe vehicle body provides the needed protection.

The safe vehicle body provides means to effectively resist and cushion collision thrusts that occur higher than common bumpers, thus providing needed protection that other types of automobile bodies lack. Such protection is needed against possible collisions with large trucks, and particularly against rear end collisions against trailer-trucks. Common automobile bodies offer no protection when they collide with the rear of a trailer, because the automobile roof is sheared off by its contact with the lower overhanging portion of the trailer and the trailer axle is too high for the automobile bumper to contact. The high front portion of the safe vehicle body can contact and cushion against the axle, while the strong top of the body can contact and cushion against the overhanging portion of the trailer body.

The safe vehicle body described in the present application provides more protection than can be provided with the bumper-like curved barrier described in my co-pending application Serial No. 721,150, filed March 13, 1958, entitled Curved Barrier. The curved barrier is not capable of effectively diverting and spreading an impact force into the adjacent shell portions so substantially all the vehicle body portions can co-act to resist the impact force.

The safe vehicle body described in the present application is an improvement over the safe conveyance body described in my co-pending application Serial No. 557,938. The present invention embodies improved means to brace and stiffen the lower portion of the shell when the shell is flattening and yielding downwardly due to an impact force. This bracing means allows the shell to resist a much greater force that tends to rupture it, allowing the shell to act efficiently in compression as a toggle-like member when it flattens and its lower edge strikes the roadway. Therefore, the braced shell can strike the roadway with great force to divert much of the collision impact force into the roadway, then to divert much of the remaining collision impact force upwardly so it is expended in raising the adjacent portions of the safe body vehicle and possibly the opposing vehicle to which it is snagged. Since the braced shell would divert considerable force and it would also absorb much force in deforming and rupturing, the depth of the permanent deformation of the automobile body would be small compared to that of common automobile bodies subject to the same collision impact, therefore the occupant's compartment would be less likely to be deformed.

The short depth of allowable deformation of the vehicle body adjacent the impact point causes a high degree of deceleration of the vehicle and the occupants. The occupants can be restrained with seat belts to an extent to prevent momentum from propelling them forwardly against rigid portions of the vehicle. The occupants can be cushioned with safety barriers so they can safely withstand a much greater deceleration than is possible with common safety belts. The safety barriers for mounting in the interiors of vehicles are described in my copending application Serial No. 662,770, filed May 31, 1957, entitled Safe Conveyance Barrier, now Patent No. 2,977,135, and my Patents No. 2,826,788 and No. 2,827,305. The belts and barriers restrain the occupants from being hurled by momentum against the walls and the like of the occupant's compartment, which is similar to eggs which are restrained from moving within a shipping container.

Another improvement is means in the safe body to hook or snag onto guard rails, walls and the like to restrain the vehicle from rising and leaping over the obstructions, also to restrain the vehicle from flipping over on its top.

The safe vehicle body of the present invention provides a means to make a relatively small automobile safe so that it adequately protects the occupants during a collision. Small common automobiles are considered to be hazardous since they can be crushed in collisions with larger vehicles that roll over them. The safe body means causes the collision impact force to deform the body to a lesser degree towards the occupants, thus tending to prevent deformation of the occupant's compartment on a small automobile. The lifting action of a collision impact tends to raise a small vehicle enough so an opposing larger vehicle pushes it aside or backwards rather than to roll over it. There is great need for means to make small automobiles safe, since such vehicles would be more practical for much of the transportation needs that exist today, particularly since they are lower in cost to build and operate and they require less space for parking. Small automobiles with safe bodies would also be safer than larger vehicles because they could be maneuvered easier, particularly without costly powered steering and powered brakes; furthermore, they could be safely driven on narrow existing streets and roads with safe clearance from vehicles or objects alongside of them.

An object of my invention is to provide a safe, durable vehicle body that will cushion, absorb, or divert violent collision forces and thus prevent injury to the people involved in the collision, as well as to prevent or reduce the damage to the vehicle and the element with which it collides. The body is expendable to safeguard the occupants from violent collision forces, which cause portions of the vehicle body to collapse after they have cushioned and absorbed much of the forces.

Another object of my invention is to provide a safe top portion for a vehicle body that will cushion and absorb violent accident impact forces against it including those caused by the vehicle body striking the roadway when the vehicle rolls over, the cushioning protecting the occupants of the vehicle and tending to prevent excessive damage to the vehicle.

Still another object of my invention is to provide a safe hood for a vehicle body that will cushion and absorb violent accident impact forces against it, including those from a roll-over accident.

Still another object of my invention is to provide a safe vehicle door that will flatten under a collision impact and cushion, absorb and divert violent collision forces against it, the door and adjacent body portions being able to co-act so a considerable portion of an impact on the door may be diverted so the collision force cannot buckle the door and injure the occupants.

Other objects of my invention will become more apparent from the following description taken with the accompanying drawings wherein:

FIGURE 1 is a fragmentary plan view of an automobile;

FIGURE 2 is an elevational view taken along line 2—2 of FIGURE 1;

FIGURE 3 is a fragmentary elevational view taken along line 3—3 of FIGURE 1;

FIGURE 4 is a fragmentary, sectional, elevational view taken along line 4—4 of FIGURE 2;

FIGURE 5 is a fragmentary, sectional, plan view taken along line 5—5 of FIGURE 2;

FIGURE 6 is a fragmentary, sectional view taken along line 6—6 of FIGURE 2;

FIGURE 7 is a fragmentary, sectional view taken along line 7—7 of FIGURE 2;

FIGURE 8 is an enlarged, fragmentary, sectional view taken along line 8—8 of FIGURE 1;

FIGURE 9 is a fragmentary, sectional view taken along line 9—9 of FIGURE 8;

FIGURE 10 is a fragmentary, sectional view taken along line 10—10 of FIGURE 8;

FIGURE 11 is a fragmentary, sectional view similar to FIGURE 8, but showing a portion of the automobile body flattened by a collision with an object;

FIGURE 12 is an enlarged, fragmentary, elevational view taken from the exterior or convex side of the body shell;

FIGURE 13 is an enlarged, fragmentary, elevational view taken from the concave side of the ribs and body shell;

FIGURE 14 is a fragmentary, sectional view taken along line 14—14 of FIGURE 12;

FIGURE 15 is an enlarged, fragmentary, sectional view taken along line 15—15 of FIGURE 2;

FIGURE 16 is an enlarged, fragmentary, sectional view taken along line 16—16 of FIGURE 2;

FIGURE 17 is a fragmentary, sectional, plan view taken through a bumper pad;

FIGURE 18 is an enlarged, fragmentary, sectional view similar to the lower portion of FIGURE 8, showing the arrangement at the base of a door;

FIGURE 19 is a fragmentary, sectional view similar to FIGURE 14 showing a modification with a skin on the plastic shell;

FIGURE 20 is an enlarged, fragmentary, sectional view similar to the top portion of FIGURE 8, showing a modification which does not have an outer shell;

FIGURE 21 is an enlarged, fragmentary, sectional view similar to the bottom portion of FIGURE 8, showing a modification which does not have an outer shell.

The automobile illustrated in the drawings has a yieldable resilient body. Broadly stated, the automobile body in accordance with the present invention consists of bowed plastic shell portions with yieldable ties across the chords of the bows. Collision impacts cause the bowed shells to yield by flattening partially, and the yieldable ties to yield by stretching until the forces are absorbed, or diverted. The automobile body shell of slightly resilient plastic is shaped and positioned to obtain optimum cushioning effect and strength when used with a small amount of metal. The plastic shell may have fiber glass strands impregnated in it to strengthen it.

The shell of the body is confined to maintain highly efficient arched or bowed shapes. The bowed shapes act as arched compression members since they yield and flatten partially in cushioning collision impacts. While the shell is flattening partially, the collision impact force is diverted and spread over a greater portion of the body so the force can be resisted by the large portion of the body that is brought into play, to thus slow down the momentum gradually by absorbing the forces gradually. There are yieldable spring ties across the chords of the bowed shell sections that yield to an extent and absorb much of the violent force. There are ribs that can yieldably flatten as they help to maintain arched shapes of the shell portions as they partially flatten. The confined arched shapes are used to obtain optimum load carrying efficiency of the material used.

The automobile body that is illustrated is substantially symmetrical about its longitudinal axis and its transverse axis, except that the doors are off-center and other minor differences that are obvious. The automobile body is shaped to provide an efficient functional structure. The body members are shaped and combined so as to provide continuity to the automobile body so the body as a unit can act to cushion and resist collision impacts. The ends and the sides of the automobile body have the highly yieldable and resilient features to cause cushioning actions from collision impacts, also to a more limited degree, these features are incorporated into the top, the hood, and the trunk lid. The arched shape of the front and rear of the automobile body is shown as being of substantially identical structural features since head-on collisions and rear-end collisions of intense magnitude are frequent occurrences. The yieldable roof, hood, and trunk lid are useful safeguards when an automobile rolls over. The overhanging edge of the roof is resilient which allows it to cushion a thrust against it. The hood and the trunk lid are sloped downwardly and outwardly to allow the driver more visibility of the roadway, also to form a stronger shaped automobile body.

As shown in FIG. 8, the bow of the shell or skin 1 and the like have a large width bow or middle ordinate which provides a considerable distance in which the shell can flatten to yield and cushion the impact force. Although this width of the bow is greater than the widths of bows on common sheet metal automobile bodies, the wide bowed shell can be used in the sides of automobiles without increasing the width of the vehicle or without sacrificing functional features. Most of the common automobiles made today have body widths that are wider than they should be which allows excess seat space into which the occupants can slide or be thrown when the vehicle veers. Occupants must be restrained with safety belts or cushionable safety barriers to prevent the momentum from hurling them towards the compartment walls during a collision, so the excess seat space is a hazard, particularly so when it is estimated that over fifty percent of the injuries sustained in vehicle collisions could be eliminated by restraining the occupants with belts and/or cushionable barriers.

The forward plastic shell section 1 and the rear shell section 2 are substantially identical. The resilient bumper pads 3 may be fastened to the shell to engage common knobbed bumpers of other automobiles and the like during collisions to act as a cushion, as a buffer, and as a means to spread the impact over a greater area of the shell. Thus the pads 3 tend to prevent the puncturing of the shell 1. The pads 3 may be air-filled tubes of rubber and nylon fabric that are similar in construction to inflated single tube tires. As shown in FIGURE 17, the pads 3 may have metal facings 3a to contact the opposing car's bumper to distribute the impact over a large area of the resilient pad 3 and thus to a large area of the shell 1. The facings 3a restrain the pads 3 from bulging outwardly except at the sides. The pads 3 and the facings 3a bend and flatten with the shell 1 during a violent collision. Resilient straps 3b fasten the facing 3a to the shell 1. The facings 3a hold the pads 3 against the shell 1.

The door 4 coacts with the adjacent body members to maintain continuity of stress carrying features to distribute the collision forces to a greater section of the body. The roof shell 5 is yieldable to cushion impacts on it when the automobile rolls over, or when the edge of the roof is struck during a collision. The hood shell 6 and the trunk lid shell 7 are slightly yieldable to allow them to yield under impacts on their convex surfaces, such as during roll-overs. The hood 6 and the lid 7 securely engage adjoining body members to brace and tie the body together, so that collision thrusts can be spread widely into the body structure until enough structure is brought into play to absorb the thrusts. The trunk lid 7 acts during a collision against the rear of the vehicle like the hood 6 acts during a collision against the front of the vehicle. The hood 6 and the trunk lid 7 in combination with adjacent side portions of the body can transmit great momentum force longitudinally during a crash so the chassis is not subjected to the whole momentum force, since the whole momentum force would tend to buckle the chassis.

Channel members 8a and 8b are curved in length to a horseshoe-like shape. They are members that take impact thrusts from the upper portion of the vertical bowed shell sections. Channels 9 are periphery chassis members, which support the lower portion of the vertical bowed shell sections. The channels 9 may have brackets 9a welded to them to provide means to mount pivotal links or braces 9b. The braces 9b restrain the shell 1 from buckling when it is flattened to an extent under a collision impact as shown in FIG. 11. The rigid roof framing members 10a, 10b, and 10c are rigidly supported by the posts 11a and 11b. The center rib-like posts 12a and 12b may be portions of a yieldable arched rib that is incorporated into the roof structure. The yieldable arched rib yields with the roof shell during roll-overs, to act as a cushion. The cross members 13a and 13b may support the ends of the posts 12a and 12b. The members 13a and 13b are supported by the channels 8a and 8b.

The center rib-like posts 12a and 12b are not highly objectionable as to their blocking vision since the center window areas are often obscured, preventing viewing through them during the worst driving conditions, such as during rain, and snow storms, as the windshield wipers do not clean these areas.

The door latches 14 may be made similar to those used on fireproof vault doors. The latches 14 are supported by framing on the interior sides of the doors 4. Mud guards 15 may be made of highly elastic plastic, which do not restrain the body from being depressed inwardly under impacts. Snow, ice, and mud tend to break loose from the elastic guards 15 since the guards flex from vibration and jolts of the automobile on roadways. The mud guards 15 flex to cushion the forces of crushed stones, cinders, and the like that are thrown against them by the wheels. Also the plastic eliminates the noise of such matter striking the guards. Furthermore the guards yield and cushion the forces from broken tire chains and eliminate noise from the pounding of such broken chains. The guards 15 do not deteriorate rapidly from chemical action of cinders, salt, and soil.

The ceiling of the vehicle body may have a curved ceiling panel 16 that can flatten to yield and cushion an occupant who is thrown against it during a roll-over accident and the like. The panel 16 may be omitted when the occupants are restrained with seat belts and/or safety barriers. The motor 17 and other members in the lower portion of the automobile are shown by the dot-dash outline in FIGURE 5.

As shown in FIGURE 8, the wire spring tie 18 forms a resilient tie across the chord line of the shell 1. Wire fasteners 19 fasten the top and bottom edges of the shell 1 to the retainers. The tie 18 is fastened to the reinforcing wire 20c and 20d in the bulb-like edgings of the shell 1. The wire 20d is spirally coiled to allow it to yield locally. As shown in FIGURES 8, 12, 13 and 14, the shell 1 has a wire grid 20 encased in it with the wires positioned horizontally and vertically at right angles to each other. A second similar grid 20a may be superimposed on the grid 20 and may be fastened to it where the grids contact each other. The grid wires may be fused together in welding so the joint of intersecting wires is flattened to one thickness. The wires in the grid 20a are positioned forty-five degrees from those in the grid 20. The plastic of the shell may have fiber glass reinforcing, in addition to the grid wires. The wire grids effectively restrain the shell 1 from shearing, tearing and cracking from minor forces, thus a large portion of the shell is made to act as a unit to absorb and resist collision forces.

The wire grids are members that resist tension and shear. The wire in the grids may be flat to allow them to bend more readily when subjected to compressive forces.

As shown in FIGURE 8, a retainer bar 21a is welded to the channel 8a. The retainer bar 21b is riveted to the channel 8a. The retainer bars form a socket-like recess to engage and securely hold the bulb-like top edging of the shell 1. The bar 21b is also a bearing bar for the upper end of the top yieldable shaft or rib 27. The tie-post 22 is attached at its bottom to the channel 9 and its top is attached to the resilient steel bar 23 and the limit bolt 24. This type of tie and support allows the hood 6 and the trunk lid 7 to yield and cushion the shock of an impact on their top surface during roll-overs. The bar 23 and the bolt 24 prevent the channel 8a and adjoining parts from rising when an impact on the side of the shell 1 tends to raise the upper portion of the automobile body. The bar 23 is yieldable downwardly but not upwardly. As shown in FIGURES 8, 10, and 11, the sliding retainer 25 takes the thrust from the lower edge of the shell 1. The retainer 25 can slide down the tie-post 22 as the shell 1 is spread in flattening under an impact.

The contact surfaces of the retainer 25 may be thinly coated with resilient plastic to eliminate chattering noise from vibration and road shocks. The retainer 25 may be tack welded lightly to channel 9 to restrain the shell and ties from flexing slightly from vibration and road shocks. This would eliminate squeaks and chattering noises. Such light tack welds would break readily when collision forces acted on the shell. Retainer bars 25a are short members that are fastened to the retainers 25. The bar 25a grips the lower bulb-like edging of the shell 1 and acts as a bearing bar for the end of the lower rib 27. The retainer shoes 25b may be fastened to retainers 25 to provide a slightly yieldable surface which evenly strikes and grips the roadway 38.

The spoke-like radial ties 26 may be used to restrain the shell 1 from bulging outwardly when the shell is struck during a collision. The ties 26 are fastened to the grid wires in the shell 1 and to the tie post 22. The ties 26 do not materially prevent the shell 1 from excessively bulging inwardly under a localized impact that tends to destroy the arched shape of the shell 1.

Yieldable shafts or ribs 27 and 28 may be used to maintain an arched shape to the shell 1 during a collision until the arched bowed shape is flattened just short of the state of collapsing. The wires 26 may be used with the ribs 27 and 28, or either the ribs or the tire wires may be used solely to restrain or confine the shell 1 to maintain a substantially bowed shape. The light-weight wires 26 take a direct pull from the shell, thus they are efficiently used. The ribs 27 and 28 may yield under an impact, while maintaining pressure on the shell 1 to maintain an arched shape to the flattening shell. The adjoining rib tips 31b of ribs 27 and 28 are shaped to limit the flattening and the bowing of the rib assembly.

The shell 1 may have rib-like portions 1a and 1b to stiffen the shell and to provide more thickness around the wires of the grids 20 and 20a, to thus increase the shell's resistance against the tendency of the grid gires to rip out of the shell during an impact. There is a wire grid system 29 that links the ribs 27 and 28 together. The ribs pivot with these grid wires acting as hinges when the shell area bearing against them flattens during a collision. There is a hole at the intersection of the wires in the grid 29 to allow the wire 26 to project through it. The wires of the grid 29 may be fused together and be flattened and pierced while hot to form this type of intersection. The hole in the grid has a loose fit with the wire 26 to allow the wire to slide slightly when the body flattens and a portion of the shell 1 spreads to the extent that the wire 26 is bent at the shell.

The offsets 30 on the wires 26 tend to hold the ribs 27 and 28 close to the shell 1. Since the length of the arc of the shell 1 tends to become equal to that of the rib assembly as the members spread and flatten, there is compensating means to allow this fluctuation. The shell 1 shortens to an extent when it is compressed by an impact. The ribs 27 may have rib tips 31a attached to engage the retainer bars 21b and 25a. The rib tips 31a may have spring portions to allow the rib system to gradually lengthen to compensate for the fluctuation. The rib tips 31a and 31b may be made of metal to allow their small bearing areas to withstand the pressures. The ribs 27 and 28 may have limit eyes similar to those shown for the horizontal rib sections 32. The horizontal rib sections 32 at the front and rear of the automobile may have limit eyes 32a to allow limited yielding when the arched length of the shell 1 flattens partially. The intermediate portion of the width of the shell 1 in the horizontal arcs of the front and rear of the body are highly compressed by front or rear collision impacts. The resilient plastic shell is compressible to a small degree. The horizontal ribs 32 have this limit means to allow the ribs to yield to a limit that maintains an arched shape that can resist forces further without materially yielding, unless very violent forces are not absorbed wholly and such forces cause the shell to rupture and collapse.

The spring tie sheets 33 may be made of high carbon steel to act as springs in the tie system to absorb thrusts that were diverted from the collision impact area into the arch. The sheets 33 have corrugations to allow them to flex. The spring 33 straightens under severe collision impacts and then rebounds to its original shape after the force is released. Sheets 33 may be pulled apart to absorb force after they have reached their limit of deflection. New sheets 33 could be readily attached to replace the sheets that are pulled apart. Sheets 33 are shown as short members spanning between retainers 25. The sheets 33 are short so the shell 1 can deflect locally. Sheets 33 may be made of less resilient steel that permanently deforms when stretched, which sheets absorb collision forces in stretching and possibly breaking. The tie sheet 34 is fastened to the channel 8a, the tie post 22, and the sheets 33. It also securely engages the upper edging of the shell 1. The bottom of the spring 33 securely engages the lower edging of the shell 1. At the upper portion of sheet 34 are two corrugations that may yield during a roll-over since the tie system can yield downwardly from impacts above. The sheet 34 may be highly resilient to allow a rebounding action. Sheets 33 and 34 act as an inner shell. Sheet 35 is a corrugated stiffener that may be used, particularly around the front and around the rear of the automobile body, where its arched shape resists a great compressive force to absorb much of a collision force before the arch collapses. Sheets 35 are fastened, such as by welding, to tie sheet 34 to prevent it from flattening or spreading in width. A seal 36 at the hood 6 bears against the shell 1. Highly compressible resilient insulation 39, such as fiber glass, may be placed in the segmental space between the shell 1 and its chord line. It would act as a cushioning means and as an insulation. The front of the automobile body shell has perforations to allow air to pass through to each and cool the motor. Resilient tubes 40 attached to these openings pass through the steel tie sheet 34.

The bowed shell 1 is shown tilted. This tilting of the bow allows a low impact against bumpers on another vehicle or against a guard rail to cause the shell 1 to deflect with a flattening action. If the bow of the shell were not tilted, an impact close to the bottom of shell 1, such as that from object 37, would cause breakage of the shell rather than the partial flattening and cushioning action. Since the center of gravity of a loaded common automobile is above the axles during a very violent head-on crash, a common automobile tends to nose down. The front of the safe automobile body tends to rise when it strikes low against a colliding object, such as object 37 shown in FIGURE 8. The impact force is diverted into the arch of the shell 1, which spreads the chord of the shell as it flattens partially under the thrust. The impact force is diverted downwardly towards the roadway and upwardly, which tends to lift the adjacent portion of the automobile body. The lifting action can absorb a great amount of force in lifting a portion of the automobile with its occupants. Thus, force is expended in the lifting action, rather than allowing it to deform and break automobile body members. If the impact force lifts an end of the automobile off the roadway, the automobile tires will cushion the fall after the force has been expended in the lifting action. When the automobile noses up, the occupants are forced down in their seats to an extent if they are held to their seats with the barrier B or common safety belts. When the shell 1 is struck high above its center by object 37a, there is less force absorbed in the lifting action than from the force of an object 37.

When automobiles traveling at high velocities collide, their momentums create collision forces of great magnitude. To safeguard the automobile occupants as much as possible, additional safety means can be used to safely cushion, divert, and absorb these violent forces. The safety barriers, such as those described in my Patents No. 2,977,135, No. 2,826,788 and No. 2,827,305, may be used in the interiors of automobiles to cushion the occupants of automobiles during collisions. A safety barrier B is shown in the forward portion of the interior of the automobile. The interiors of automobiles may also be padded where the barriers do not furnish cushioning means.

During very violent collisions, the automobile body must yield gradually to adequately cushion collision impacts to protect the occupants. The yielding must be limited so the occupant's compartment remains intact and it is not penetrated by failing portions of the automobile. The more violent collision impacts against the automobile body will tear, buckle, and crush portions of the body. The resistance to the impact and the gradual yielding of the front of the automobile body is as follows. The resilient shell, ribs, and ties yield while the shell maintains a bowed shape that causes the shell to act in compression. Force is absorbed to stretch the spring ties, bend the resilient plastic and compress the fibers of the shell with the compressive arched force. After the limit of yielding of the spring ties is reached, further force can be absorbed by the pull on the ties until they break, if the ties are so proportioned that they reach their limit of deflection before the shell strikes the roadway 38. The limit of the partial flattening of the shell, while maintaining an arched shape caused by either its contact to the roadway 38 or by the spring ties holding after yielding, causes the shell 1 to resist as an arch without yielding materially, unless the force is so great as to cause further yielding until the ribs bear against the arched sheet 34. The arched sheet 34 is confined and strengthened by its relationship with the portions of the front of the automobile body consisting of the channel 9, the channel 8a, the tie post 22 with its connectors, and sheet 35. This portion of the body forms a lateral arched structure that is tied and stiffened by the hood 6 and the motor 17.

The hood 6 is kept securely latched in position. The hood edging is keyed to the top of channel 8a so that it ties the front of the body together and can effectively transmit stresses. When a collision force almost flattens a portion of the shell 1 to the shape shown in FIGURE 11, the ribs 27 and 28 bear against the arched sheet 34. The tie post 22 behind the sheet 34 prevents the sheet 34 from readily buckling. The corrugations in the sheet 34 and the corrugated sheet 35 also restrain the sheet 34 from buckling. Pin 25e transmits force from retainer 25 to brace 9b.

The brace 9b restrains the shell 1 from buckling and restrains the channel 9 from twisting from the pressure against the convex surface of shell 1 when the shell is flattened as shown in FIG. 11. When the shell 1 flattens to the limit, the impact force is transmitted horizontally through the intermediate portion of the shell 1 into the ribs 27 and 28, then into the tie-post 22 and from there into the channels 8a and 9. The brace restrains the tie-post 22 from bending.

The auto body members may be proportioned so the lower edge of the shell 1 will spread down in flattening under a violent impact until the retainer shoe 25b strikes the roadway 38. The adjacent edge portions of the shell 1 will tend to yield and strike the roadway 38. The striking force of the retainer shoes 25b and the shell against the roadway 38 transmits much force into the roadway, thus harmlessly diverting and absorbing it. When some retainer shoes 25b and portions of the shell 1 strike the roadway 38, while the collision force is still flattening and spreading the ribs and the shell 1, the spreading action tends to lift the automobile body portion near the point of impact. The spreading action is a toggle-like action which can divert a great collision force. The high velocity of the collision impact would cause the shoes 25b to intensely strike the roadway 38, which would tend to rapidly propel or hurl upwardly the portion of the vehicle adjacent to the collision point. The shell 1 would tend to snag onto the bumper knobs and the like of vehicles it collides with, thus interlocking the two vehicles while the momentum presses them closer together. Therefore, when the ribs and shell 1 flatten they tend to lift the engaging portions of both vehicles, thus much force is also absorbed in tending to lift the opposing vehicle. The bracing 9b tends to prevent the ribs and shell 1 from rupturing while they are highly stressed when raising both vehicles. When the opposing vehicle is so heavy that the lifting action cannot raise it, force is absorbed by friction and rupturing of the engaging portions of the two vehicles. The shell 1 would tend to fracture by tearing where it is snagged onto the opposing vehicle.

When the impacted portion of a safe vehicle body is raised by the shell 1 flattening under a collision impact against a truck and the like, the safe vehicle is pushed backwards or aside by the heavy truck, thus tending to prevent the truck from riding over top of it and crushing it.

The vehicle body members shown in FIGS. 8 and 11 are combined so they are forced to act to a very high degree of efficiency to divert and absorb intense impact forces before they are ruptured. During a very violent head-on collision, the spreading and lifting effect tends to bend up the whole front of the automobile, including everything from the hood 6 down to the front wheel springs. The collision force deforms the arched members 8a, 9, 34, 35, and the shell 1, and causes them to collapse after bending. The hood 6 acts as a tie across the chord of the arch of channel 8a. The motor 17 acts as a tie across the chord of the channel 9. These tied arches are very strong types of structures, therefore they can resist great collision forces that tend to deform them. When collision forces are so great that they buckle the tied arches, much force is spent in deforming these members. The bending and lifting action absorbs considerable force.

The bending tends to deform the laterally arched shape of the front of the automobile so the latter portion of the colliding force tends to crush it. Thus the front of the automobile body could be almost completely destroyed to cushion and absorb the violent forces, while the portion of the automobile body housing the occupants remains intact. Since the motor is fastened to the channel 9, when the channel 9 bends up, it tilts the motor 17. Thus the motor 17 will be tilted up on end during a very violent crash, rather than be pushed directly back into the occupant's compartment. This means to raise the motor is an advantage not possible with common automobiles. During some violent collisions, the motors of common automobiles are pushed back as far as the rear seats which causes the killing or maiming of the occupants. Therefore, the collision impact force is in general largely diverted downwardly and upwardly, tending to prevent rupturing of the vehicle body portion that closely confronts the occupants. When the uplifting action is progressing, the lateral forces compress the arched front of the automobile body. When the various strains cause breakage, the front portion of the body tends to gradually collapse and be crushed if the remaining force is great enough to cause that action. When the shell spreads downwardly and one or more shoes 25b and portions of the shell edging bear or snag into the roadway 38, particularly a blacktop type roadway, the bracing 9b and the intense bearing engagement to the roadway tends to prevent the lower adjacent portion of the shell 1 from failing inwardly, thus tending to maintain a lateral arched shape to the front of the automobile body.

The automobile body members may be proportioned so the ties 18 and 33 will reach their limit of deflection and resist the impact force until they are ruptured by being pulled apart just short of the position where the lower edge of the shell 1 contacts the roadway 38. The ties 18 may be proportioned so they will reach their limit of deflection and break, before the ties 33 reach their deflection limit. Thus, the ties could be broken to absorb considerable force and prevent a violent rebound from the colliding object 37. When the ties are broken, shoes 25b and a portion of the lower edge of the body shell structure strikes and bears against the roadway 38.

The automobile body members may be proportioned so the surface of the roadway 38 acts a limit for the spreading of the shell 1, the springs having deflection latitude past the roadway limiting means. When the vehicle is heavily loaded, the springs with which the vehicle body is mounted are deflected to a great degree causing the lower portion of the shell 1 and the like to be positioned closer to the roadway 38. During a collision the deflected vehicle body causes the shell 1 to flatten less before it strikes the roadway 38, which causes more jacking movement by the shell flattening action. This additional high velocity jacking movement would tend to hurl the front portion of the heavy vehicle upwardly before the momentum of the rear portion of the vehicle has compressed the length of the vehicle body to the extent that the momentum is transmitted to the front porion of the vehicle. Therefore, when the vehicle strikes a wall or the like, the front can be forced upwardly, allowing the rear of the vehicle to move towards the wall. The rear tires and springs would then cushion the rear of the vehicle against the wall.

The portion of the body bearing against the roadway 38 or the shoulder of such a roadway tends to snag and create a great deal of friction if the automobile continues to move after striking an object 37, which may be a guard rail. The friction would absorb force and tend to stop the car movement. Thus if a guard rail yields and fails, the friction or snagging action may tend to stop the car before it reaches the outer edge of the roadway shoulder. When the safe body strikes a guard rail, the shell 1 would flatten and dig into the roadway shoulder, thus causing little lifting action. The tops of the facings 3a would act as hooks to catch guard rail cables and the like. There is a hook-like projection 25c on the retainer 25 that tends to catch a guard rail cable and the like if the shell 1 flattens and the vehicle tends to leap over the guard rail. The upward pressure on the hooks 25c would stretch the guard rail cable upwardly and absorb some collision force, besides restraining the vehicle from lifting. The outer end of hook 25c has a chisel point which would tend to snag objects with which it collides. This snagging would generally take place after the shell 1 has flattened and the front portion of the vehicle is hurled upwardly due to the shell 1 striking the roadway 38. The hooks 25c would be able to snag obstruction, such as utility poles, trees, walls and the like that they would strike during a collision. When the hooks 25c have penetrated an obstruction, the upward force that is raising the front portion of the vehicle would cause the hooks 25c to bend, shear off or gouge out vertical portions of the obstruction, thus absorbing some of the collision force that was diverted upwardly. This absorbing of the upward force would tend to reduce the possibility of flipping the vehicle over on its top. The hooks 25c would tend to remain snagged to the obstruction when the upward force is spent in gouging out the obstruction, therefore the snagging would restrain the vehicle from bouncing aside into the paths of other moving vehicles. The friction of the panel 1 against the obstruction would act like the hooks 25c to restrain the vehicle from overturning.

The automobile body may be designed so the shell 1 does not spread down as far as the roadway. This type of arrangement would be more limited in diverting and absorbing collision forces. It would be suitable for use in districts that have sand or dirt roads. Such roads could not absorb much striking force of the shell 1 or cause much lifting action.

An automobile body of more limited usefulness may be made without springs or ties across the chord of shell 1. The ribs and/or shell 1 will spread and divert the forces downwardly to the roadway and upwardly in lifting actions.

The vehicle body shell may be made very thin so it is suitable to act as a curtain to protect the interior of the vehicle and the occupants from the weather, also to streamline the body to reduce air turbulence around it. Such a shell 1 may be made with very thin metal or with fiber glass with a small amount of plastic. The fiber glass may be in either random-oriented or fabric form. The ribs 27 and 28 would take the collision impact with the shell 1 yielding without materially being stressed.

A safe vehicle body shell may be of stiff or brittle plastic. The collision force would cause the brittle plastic to crack when it is flattening, the reinforcing holding the cracked fragments together to an extent. The cracked fragments would act like stones in a stone arch to momentarily resist in compression while diverting the thrust into the roadway 38 and into the lifting action before the shell collapses. The brittle plastic may be deeply scored on its concave side to cause it to crack where it is scored when it is flattened to an extent. Considerable force would be absorbed by the cracking and crushing of the brittle plastic.

A modification of the automobile body shown in FIGS. 1, 8, and 11 may have an end portion without a shell 1. The sheets 33 and 34 act as the shell portions of the ends of the vehicle body. During a head-on collision, the vertical rib assembly formed with ribs 27 and 28 would flatten under a collision impact. The shoes 25b would strike the roadway and cause the front of the vehicle to lift, thus absorbing force. The assembled horizontal ribs 32 would flatten and thus spread the force into adjacent vertical ribs 27 and 28 and into the whole vehicle body, therefore causing the whole body to co-act to resist a localized collision impact force. Such a modification may use the exposed ribs as grillage. Such a grillage would be both useful for safety and ornamental. This grillage would be an improvement over common grillage that is purely ornamental, very costly, and highly vulnerable to damage by collision impact forces.

The vehicle body may be modified by omitting the horizontal ribs 32.

FIGURE 15 shows the typical roof and ceiling details, also the door header and the upper portion of the door 4. The periphery of the roof may have resilient cushioning means to cushion impacts during roll-overs. The side edges of the roof can yield and cushion collision impacts against them. Strong resilient curved steel bars 41 may be attached to the rigid framing 10a, 10b, and 10c to form a cushioning means. The ends of the bars 41 may be inserted into holes in the framing members. The dished roof shell 5 may have an offset 5a to project out past the rigid framing to engage and cover the rods 41, to act with the rods 41 to cushion impacts and to act as a trim. The roof edging will cushionably yield during roll-overs in either direction.

As shown in FIGURE 15, the end of the shell 5 is fastened to the resilient crimped steel tie sheet 42. The sheet 42 is attached to the outer face of the member 10c. The end of the offset 5a is fastened to the sheet 42.

During roll-overs, the shell 5 flattens to an extent when impacted on its intermediate portion. The plastic in the shell 5 compresses to an extent from the impact force. The impact force is diverted into the arched directions of the shell 5.

The sheet 42 has crimps at right angles to each other, which allow it to yield when the shell 5 flattens. The sheet 42 can slide against the top of member 10c as it stretches. The vertical edging of the sheet 42, being fastened at the bottom, is allowed to bend, or hinge out.

There are fingers punched upwardly from sheet 42 to act as anchors for the roof shell 5.

The curved plastic ceiling panel 16 is curved in one direction to form a safety barrier, similar to that described in my Patent 2,826,788. The sheet 42 acts as the tie for the panel 16 in addition to being a tie for the shell 5. The panel 16 is fastened to the tie 42 and it may be attached as shown to the ribs in the shell 5. There is a gap between the end of the panel 16 and the member 10c, to allow the panel to flatten to an extent when an occupant is thrown against it during a roll-over accident. The shell 5 and the panel 16 may be connected with hangers or ties 43.

The door 4 may have a curved safety barrier 44 built into its inner portion. The barrier 44 may be omitted when the occupants are restrained with seat belts and/or safety barriers, such as those described in my co-pending application Serial No. 662,770. The barrier 44 may have a catch or snubber to prevent violent rebounding of an occupant who is hurled against it during a collision. The barrier 44 has a transparent portion to allow visibility through the window. The bulb-like cushion 45 is attached to the member 10c at the door. The cushion 45 may be made of plastic that is resilient enough to allow it to deflect without cracking when an occupant is thrown against it. It may be an inflated elastic tube of rubber and nylon. The top of the barrier 44 will bear against the member 10c when the barrier is flattened by the force of an occupant's body that is hurled against it during a collision. The barrier 45 spreads downwardly when flattening. The door 4 has a bowed shell, ties and tie-posts similar to arrangement shown in FIGURE 8. The door 4 has an angle iron 46 along its bottom. The tie-posts 47 in the door 4 are attached to the angle 46. The angle 46 bears against the channel 9. The tops of the tie-posts 47 are rigidly fastened to the horizontal cross piece 48. The shell and ribs of a door 4 can flatten under a collision impact and divert force into the roadway 38 and into lifting action, thereby allowing a door 4 to provide considerable protection for the vehicle occupants, particularly for the occupant seated close to the door. The lifting action tends to prevent a larger vehicle from crushing and overriding the side of the safe vehicle body.

The shell of the door 4 may be braced to stiffen it when it flattens. As shown in FIGURE 18, the pivotal links or braces 9c may be used to stiffen the lower end of the door ribs and shell when they flatten. The braces 9c are mounted on the floor brackets 49a. There is a slot in the end of the brace 9c which engages the pin 25e when the door 4 is closed. A stiff wire tie 9d ties the brace 9c to the channel 9 to prevent the brace from dropping when the door is opened. The tie 9d would break readily when the door flattens under an impact.

The floor 49 of the automobile stiffens the chassis channel 9, restraining the channel 9 from bending from the thrust of an impact against the shell of the door 4. The floor 49 may be ribbed to stiffen it. Since collision impacts are diverted and spread to large enough portions of the automobile body to allow the forces to be absorbed, the door 4 has offsets 4a and 4b to engage grooved keyway-like portions of the shells 1 and 2, as shown in FIGURE 16. These interlocking parts allow both tensile stresses and compressive stresses to be transmitted through the door structure. The latch 14 tends to hold the door shell in alignment with the shells 1 and 2.

During an automobile collision, the driver is usually injured by the steering wheel and its shaft. A round padded steel bearing plate 50 may be securely mounted within the wheel to provide a large surface for the occupant's body to bear against during a collision. The momentum of the driver's body is safely transmitted to the steering wheel to bend the wheel and possibly the steering column to cushion the driver and to provide a longer path in which to decelerate. The padded plate 50 prevents people from being injured by the narrow steering wheel rim, spokes and the steering column end. The plate 50 acts as a buffer against a steering column that is pushed in by its lower portion being impacted by a colliding object. The steering wheel may protrude past the end of the steering column to provide more cushioning space when the wheel is bent in.

FIGURE 19 shows a fragment of a modified automobile body shell. A skin 51 is on the convex side of the plastic shell 1. Steel and aluminum are suitable for use as a skin 51. The tie wire 26 may be fastened to the skin 51. This modification allows the use of the skin 51, with the plastic giving thickness to the shell to restrain it from buckling to an extent. The skin 51 may be made of fiber glass fabric, the fabric being impregnated with plastic. The skin 51 may be used as the shell without the plastic 1. Ribs 27 and 28 along with the resilient ties may be used effectively to cushion, absorb and divert the collision force with such an arrangement. Although these ribs are small members, they are trapped and forced to transmit great collision forces.

FIGURES 20 and 21 show a modification that does not have a shell 1 or spring ties 18. This modification has pin connected ribs 27c and 27d that yield and flatten to divert a collision impact force. The rib 27c is pin connected to the retainer bar 21b. The rib 27d is pin connected to the retainer bar 25h. Ribs may have hook-like recesses, such as the recess formed by hook 27e in rib 27c. Such recesses would tend to catch onto guard rail cables and the like, to restrain the vehicle from leaping over a guard rail. This modification is suitable for the front and rear of a vehicle.

While I have illustrated and described certain specific embodiments of my invention, it will be understood that these are by way of illustration only, and that various changes and modifications may be made within the scope of the following claims.

I claim:

1. A vehicle body having yieldable shaft means which is substantially bowed outwardly throughout in a vertical plane and having a rigid framework, said yieldable shaft means having upper end portions, said upper end portions having fixed pivotal bearing means, said fixed pivotal bearing means pivotally engaging said framework, said shaft means having lower portions, said lower portions including yieldable bearing means so as to permit it to move downwardly away from said upper end portions and onto the roadway surface as the result of impact force of an object against the outer surface of said shaft means which results in partial flattening of said shaft means, whereby much of the said impact force is diverted into said roadway when said lower portions strike the said roadway, and whereby the remainder of the said impact will further flatten said shaft means, causing the adjacent portion of said body to rise away from said roadway surface and absorb more of the said impact force by the lifting action, said yieldable bearing means including pivotal link means having one end portion pivotally engaged to said framework inwardly away from said shaft means, and the other end portion pivotally engaging said lower portions, whereby when said lower portions are stressed by said impact, said link means braces said lower portions, said lower portions include hook means for grappling an object which said vehicle boy collides with, whereby when said shaft means flattens and propels an adjacent portion of said vehicle body upwardly, said hook means bears upwardly against said object, thereby absorbing some of said impact force in tending to raise said object and thereby restraining said adjacent portion of said body from rising an excessive distance.

2. A vehicle body as recited in claim 1 wherein said vehicle body includes means for yieldably resisting said flattening of said bowed shapes of said shaft means.

3. A vehicle body as recited in claim 1 wherein said vehicle body includes spring means for yieldably resisting said flattening of said bowed shapes of said shaft means.

4. A vehicle body as recited in claim 1 wherein said shaft means includes two shafts in spaced relationship.

5. A vehicle body as recited in claim 4 together with a horizontal rib, said horizontal rib engaging an intermediate portion of each of said shafts, whereby impact against said horizontal rib will cause said shafts to coact and yieldably resist said impact by flattening to an extent.

6. A vehicle body as recited in claim 4 together with a bowed flexible panel engaging each of said shafts, whereby impact against said bowed panel will cause said panel and said shafts to coact and yieldably resist said impact by flattening to an extent.

References Cited in the file of this patent

UNITED STATES PATENTS

| | | |
|---|---|---|
| 2,790,674 | Barenyi | Apr. 30, 1957 |
| 2,838,341 | Watson | June 10, 1958 |
| 2,879,105 | Stahl | Mar. 24, 1959 |
| 2,916,324 | Graham | Dec. 8, 1959 |